June 16, 1931. C. W. VOGT 1,810,864
PROCESS FOR THE PRODUCTION OF FOOD PRODUCT BRICKS
Original Filed Oct. 25, 1929 2 Sheets-Sheet 1
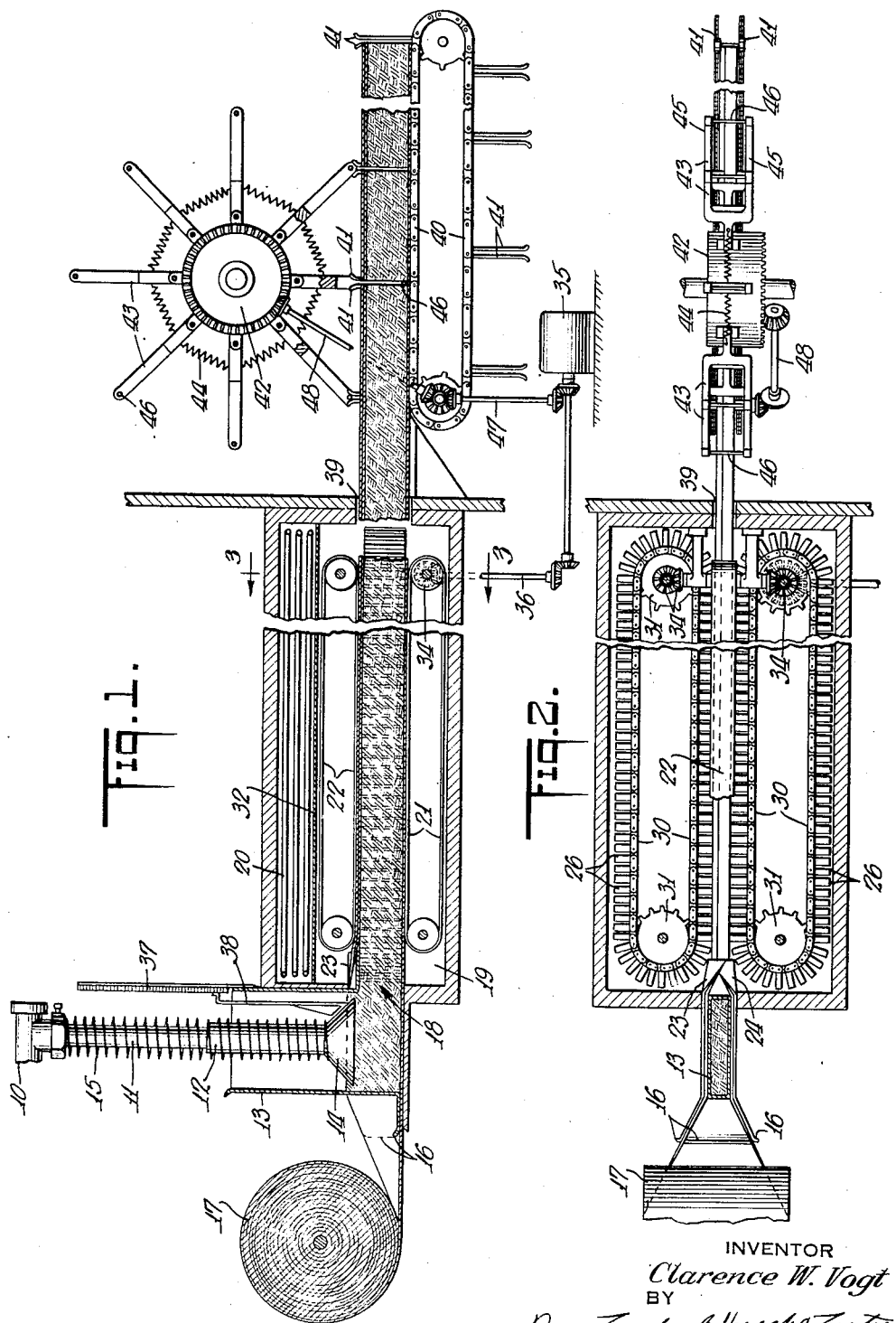
INVENTOR
Clarence W. Vogt
BY
ATTORNEYS June 16, 1931. C. W. VOGT 1,810,864
PROCESS FOR THE PRODUCTION OF FOOD PRODUCT BRICKS
Original Filed Oct. 25, 1929 2 Sheets-Sheet 2
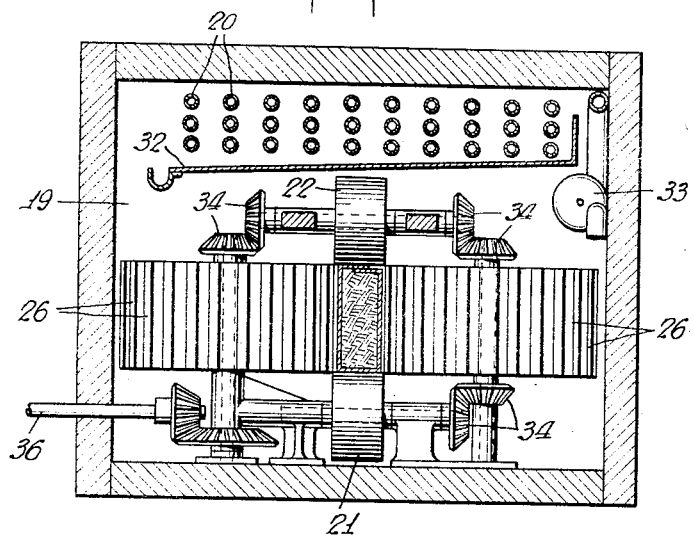
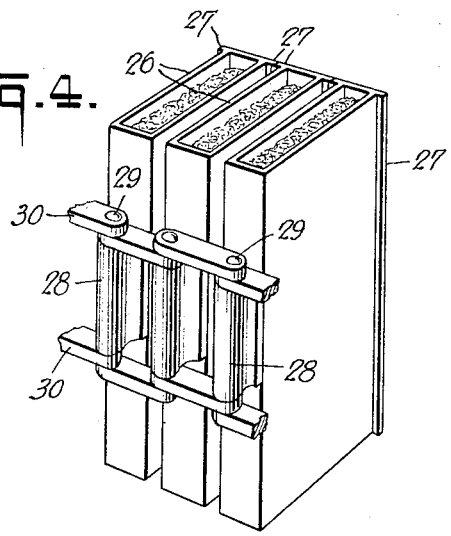
INVENTOR
*Clarence W. Vogt*
BY
ATTORNEYS Patented June 16, 1931

1,810,864

UNITED STATES PATENT OFFICE

CLARENCE W. VOGT, OF LOUISVILLE, KENTUCKY, ASSIGNOR TO VOGT INSTANT FREEZERS INCORPORATED, OF LOUISVILLE, KENTUCKY, A CORPORATION OF DELAWARE

PROCESS FOR THE PRODUCTION OF FOOD PRODUCT BRICKS

Original application filed October 25, 1929, Serial No. 402,339. Divided and this application filed January 9, 1931. Serial No. 507,629.

The present invention involves a process for the continuous production of ice cream or other analogous food products in brick or block form and this application is a division of my prior co-pending application Serial No. 402,339, filed Oct. 25, 1929, in which application there is claimed the apparatus hereinafter described for the carrying out of my improved process.

Although the present invention is particularly applicable for use in making ice cream bricks, it is likewise useful in the manufacture of bricks, blocks or other solid bodies of margarin, lard or other food products made from vegetable or animal oils, or fruit juices, plastic cream and the like, which are liquid at body temperature, namely about 98° F.

In the manufacture of ice cream it is customary to first partially freeze the mix to a plastic condition and thereafter place the partially frozen ice cream in the hardening room where it remains at such a low temperature that the freezing progresses to the desired point. If it is desired to make ice cream bricks or bodies of definite size and form the partially frozen ice cream is packed in molds which are placed in the hardening room. Considerable time is required in the filling of the molds and a longer time is required for hardening.

In my prior Patent No. 1,742,171, dated Dec. 31, 1929, I have disclosed and broadly claimed a process in which the partially frozen ice cream with the air whipped therein is continuously delivered to a conveyor in the hardening room. The ice cream is continuously advanced through the hardening room while subjected to very low temperature so that as it is delivered from the hardening room or chamber the freezing action has been completed to the desired extent and the ice cream is sufficiently hard for shipment or direct consumption. My present invention is an improvement on the process disclosed in said patent, although as above pointed out, it is not limited to the treatment of ice cream.

As one important feature, the edible material is caused to assume a definite form in cross-section as it enters the hardening room so that it is frozen or solidified as a continuous bar of the desired cross-sectional area.

As a further important feature the material is delivered in a liquid or semi-liquid condition and is refrigerated as it is being advanced and confined to the pre-determined cross-sectional area so that it emerges as the solidified or relatively hard and stiff bar.

As a further important feature the material is delivered to a wrapper which serves to enclose it and to prevent the material from contacting with or freezing to the conveyor which advances and refrigerates the material.

As a further feature, vegetable oils which have been previously treated with a non-oxidizing gas may be packaged without contact with the air.

As a further important feature the material may be delivered to the wrapper under pressure which serves to cause the wrapper to conform closely to the refrigerated or heat removing surfaces and thereby maintain most intimate relationship therewith as well as to insure complete filling out of the wrapper to the desired shape. This is especially effective and desirous with a semi-frozen or somewhat plastic material.

As a further important feature the rate at which the solidified bar is advanced is automatically controlled in accordance with the rate of delivery from the source of supply of the material to be solidified.

As a further important feature the enwrapping, advancing and solidifying operations are performed continuously and progressively and the wrapper together with the enwrapped material is subdivided into successive sections.

The invention involves various other important features which will be pointed out hereinafter or will be apparent from a consideration of the specific embodiment of the process hereinafter described.

In the accompanying drawings I have illustrated only one embodiment of an apparatus which may be employed for carrying out my improved process, but it will be apparent that the process is not limited to the use of such an apparatus and that various changes may be made in the details of construction and arrangement of the parts of the apparatus as well as in the specific way in which the process is preferably carried out.

In these drawings:

Fig. 1 is a vertical longitudinal section through the apparatus;

Fig. 2 is a top plan view of certain of the parts, other parts being shown in section;

Fig. 3 is a vertical transverse section on the line 3—3 of Fig. 1, but on a larger scale; and Fig. 4 is a perspective view of a portion of the freezing conveyor.

In the specific form illustrated the ice cream is delivered from any suitable source through a conduit 10. For instance, it may be delivered from apparatus of the type disclosed and broadly claimed in my prior Patents 1,783,864, 1,783,865, 1,783,866 and 1,783,867, granted Dec. 2, 1930. The ice cream has previously been partially frozen and had air whipped into it to give the desired overrun. The supply conduit 10 may be connected directly to a continuously delivering freezer or it may be connected to a hopper in which batches are delivered from one or more batch freezers of the usual type.

The supply conduit 10 is provided with a delivery conduit including two telescoping sections 11 and 12 depending therefrom and terminating within a receptacle 13. The lower end of the lower section 12 is provided with a head or member 14 beneath which the ice cream is delivered under the pressure at which it was produced. The head maintains at least some of the pressure and forces the material to completely fill the wrapper. The two sections are encircled by a coil spring 15 which may tend to lift the lower section against gravity and in opposition to the friction or drag of the material passing through the lower section 12.

The details of this part of the apparatus form the subject matter of a separate application Serial No. 402,362, filed Oct. 25, 1929.

The lower part of the receptacle 13 is of a width substantially equal to the width of the desired ice cream brick and the head 14 is preferably of slightly less width and of approximately the same cross-sectional form as the receptacle 13 so that the head may freely move vertically in contact with the walls of the receptacle and put the material under pressure. One vertical wall of the receptacle 13 has a transverse slit at the angle of intersection of the bottom and vertical slits at the angles of intersection of the two sides. Leading to these slits are paper guides 16 so that paper from a roll 17 may be folded to substantially channel shape and delivered transversely through the lower portion of the receptacle to form a lining for the bottom and for two opposite sides. If desired the paper may be creased or scored before being wound on the roll 17 so as to facilitate bending of the strip to channel form. I have shown the roll 17 comparatively close to the guides, but it is evident that the roll should be far enough away to permit the proper bending of the paper without tearing, undue stretching or wrinkling.

The receptacle at the side thereof opposite to the paper guides 16 is provided with an outlet 18 of approximately the width and height of the solid bar into which the ice cream is to be hardened. This outlet delivers directly into a hardening chamber 19 which is kept at a very low temperature by means of refrigerating coils 20 or other suitable cooling means. The temperature in the hardening chamber should be such in respect to the length of the chamber and the rate of travel of the material therethrough that the ice cream will be hardened at least to such an extent that it will hold definite form and may be readily handled as bricks or blocks after it emerges therefrom.

The means for transmitting the cooling action directly to the bar of ice cream and for simultaneously advancing the bar, constitutes an important feature of the invention.

In the form illustrated there are employed a pair of endless conveyors 21 and 22 mounted on suitable pulleys to provide parallel runs of the conveyors spaced apart to the height of the ice cream bar. As shown the upper run of the conveyor 21 forms a support for the bar while the lower run of the upper conveyor 22 engages with the upper surface of the bar. Between the inlet to the hardening chamber and the upper conveyor there is provided a paper guide or folding parts 23 and 24 for turning the free edges of the paper over onto the top of the ice cream bar in overlapping relationship so that neither conveyor directly engages with the material. The material is thus encased within a jacket or envelope which advances with the material. The conveyors 21 and 22 may be of any suitable material, although preferably they are of metal belts so that they have a comparatively high heat transferring effect and tend to cool the upper and lower surfaces of the bar. It will be evident that any heat which they extract from the bar will be directly radiated to the very cold air of the chamber and each conveyor, after leaving the ice cream bar, is recooled before re-engaging with the bar.

The bar is of very much greater height than width so that the surfaces which are exposed to contact with the conveyors 21 and 22 are comparatively narrow. The main hardening effect is effected by the extraction of heat from the two vertical sides of the bar as the latter advances.

The conveyors which engage with the sides of the bar are preferably of a special construction which may be as shown in detail in Fig. 4. A plurality of receptacles 26 each carry a refrigerating medium of high capacity, such for instance as a gas mixture of partially congealed water and calcium chloride or other material having the effect of lowering the freezing point. The receptacles are spaced to a short distance apart so that air may freely circulate therebetween while the operating surfaces are provided with laterally extending flanges 27 which abut to form a substantially continuous surface for direct engagement with the side surfaces of the ice cream bar. The several receptacles are connected together by links or are separately mounted on a chain or are otherwise connected so that they form an endless series. Merely as an example each receptacle is shown as provided with a series of lugs 28 serving as bearings for pintle pins 29 connected together by a series of links 30. These lugs 28 thus serve as transverse elements of a chain whereby the chain may be supported on and operated by a pair of sprocket wheels 31.

The flanges 27 of each receptacle are free from those of the adjacent receptacles so that the series may freely pass around the sprocket wheels as indicated in Fig. 2. These receptacles which are at very low temperature serve to extract sufficient heat from the ice cream through its movement in contact with the receptacles to effect the desired hardening of the material. During the return run of the receptacles and while they are out of contact with the material they are recooled by the intensely cold air in the chamber, this action, of course, also taking place on the forward run while the receptacles are in contact with the material.

Preferably the refrigerating coils 20 are mounted at the upper part of the receptacle with a partition 32 therebeneath. This partition also serves as a drain member to prevent any condensation from dripping onto the apparatus therebeneath. There is preferably provided an air circulating means which is illustrated somewhat conventionally as a blower 33 for forcing air across the refrigerating coils above the partition 32 and causing this cooled air to continuously pass over and between the several receptacles 26. By reason of the fact that these receptacles contain a refrigerating agent they in themselves operate to directly chill the material, and any ice in them which has melted during the heat absorbing run with the material will be rechilled by the cold air during the return run. Therefore the receptacles serve not only as heat conductors, but also as storage reservoirs. They maintain their extremely low temperature throughout their heat absorbing run due to the nature of the refrigerant contained in the receptacles and the high ratio of heat dissipating surface to heat absorbing surface which according to the drawings is over 5 to 1.

The shafts of the supporting pulleys for the conveyors 21, 22 and the shafts for the sprocket wheels are all interconnected by suitable gearing 34, as shown particularly in Fig. 3, so that all of the conveyors are advanced at the same rate. The four conveyors engage the four sides of the material and maintain it of the desired shape and cross-section during the hardening, but as previously noted they do not directly contact with the material, but only with the envelope or jacket which is around the latter. It is important that the conveyors operate with a speed which is directly proportional to the rate of delivery of the partially frozen material to the receptacle 13. To accomplish this purpose the conveyors may be operated from an electric motor 35 which operates to drive a shaft 36 which extends into the hardening chamber. The pressure applying and material distributing head 14 in the receptacle 13 will rise if the material is delivered to the receptacle at a faster rate than it is conveyed therefrom through the hardening room and will descend if the material is delivered to the receptacle 13 at a lower rate. This vertical movement of the head 14 or of some part connected to or associated therewith is utilized for controlling the speed of the electric motor.

As illustrated there is a rheostat 37 adjacent to the receptacle 13 and a movable contact bar 38 is connected to the head 14 so as to move along the rheostat. As the head 14 rises the rheostat will operate to deliver more current to the electric motor so as to operate the conveyors at a more rapid rate and as the head 14 descends the speed of the motor 35 will be reduced. The rheostat is only very conventionally illustrated as it will be obvious that the member 28 may be connected to the ordinary rheostat or to any other suitable mechanism which will operate to vary the sped of drive of the conveyors. Merely as an indication of such range of equivalency there may be a Reeves drive in the connection between the source of power 35 and the shaft 36 and the movement of the head 14 may operate through suitable mechanism to vary the driving speed relationship of such a Reeves drive. Various other means may be employed for accomplishing the same result.

The wall of the hardening chamber 19 opposite to the opening 18 is provided with an outlet 39 through which the hardened bar of ice cream is delivered. In some apparatus this bar may be cut into sections by hand and the separate sections conveyed to storage or for direct transportation to the retail stores or points of consumption, but preferably mechanism is provided for subdividing the bar into sections of uniform length. Merely as an example of such a mechanism I have illustrated a cutting apparatus of the wire type. A conveyor 40 supports the bar of material as it is delivered from the hardening room and this carried a series of guides 41 extending outwardly at right angles thereto. These project upwardly at opposite sides of the advancing ice cream bar to a distance slightly above the upper surface of the latter and the guides are preferably flared or spread apart at their free ends to facilitate the entry of the cutting wire therebetween. Mounted above the bar is a rotatable member 42 which carries the cutting elements and forces them downwardly through the ice cream between the several series of guides 41 as the latter advances with the material. Merely as an example of such a cutting mechanism I have shown the rotatable member 42 as provided with a series of arms 43 pivoted thereto and extending radially therefrom. These separate arms are connected by coil springs 44 so that they normally retain their radial positions and proper spacing. Each arm at its outer end is preferably forked or provided with separate tines 45 spaced apart to a distance slightly greater than the width of the ice cream bar and the guides which travel alongside of the bar. The two tines or forks of each arm are connected by a transversely extending cutting wire 46 which may pass downwardly through the material while guided by the guides 41, and thus sever the material into sections. The rotatable member 42 and its arms are so proportioned and so timed that as each pair of guides 41 advances, the cutting wire will enter therebetween, and as the movement continues the wire will be forced downwardly between the guides to the bottom of the ice cream bar and then move upwardly and out from between the guides.

As the bar moves at a substantially uniform rate in a straight line which is tangential to the direction of movement of the cutting wires, it will be evident that the wires must travel along with the bar at the same rate as the latter during the cutting action. The cutting wires may travel at a uniform rate in a circular path when out of contact with the material. The springs 44 permit the slight deceleration and acceleration of the arcuate movement of the cutting wires during the cutting action. The range of movement of the parts is such that the cutting wires pass not only through the bar of ice cream itself, but also through the paper which encloses it so as to completely sever the wrapped bar into sections. The cutting member as well as the conveyor 40 and guides 41 must, of course, vary their speed with any variation of the speed of the conveyors in the hardening room, and therefore they are preferably connected to and operated from the same source of power. Merely as an example I have shown the motor 35 driving the conveyor 40 through a shaft 47, and a further shaft 48 transmits the power to the rotatable member 42.

It will be noted that the material after it has been cut into sections will still be wrapped in paper on four sides and only the two ends will be exposed where the cutting has been done. Thus the blocks or bricks may be picked up and handled without directly contacting with the material and may be stored, conveyed and sold to the customer in this condition. It is, of course, obvious that if desired they may be additionally wrapped after the cutting so as to protect the exposed ends.

Due to the extremely efficient heat absorbing character of the conveyors, the material will be frozen to the desired hardness while traveling through a shorter chamber and at a faster rate than is possible with less efficient freezing means. Obviously the length of the chamber and the rate of travel of the conveyors are inter-related and may also be varied in accordance with the degree of hardness desired. The ice cream may be hardened to such as extent as will permit of its direct shipment and sale or in some cases the hardening need be only such as will insure the brick retaining its shape while delivered to a further hardening or storage chamber.

It will be noted that in the specific form of apparatus illustrated each receptacle 26 has a comparatively narrow heat absorbing surface juxtaposed to and in heat absorbing relationship to the material to be treated, and that the receptacles are comparatively thin. Thus the heat which is absorbed through the narrow faces is dissipated from comparatively wide surfaces to the refrigerant in the receptacles and to the air or other fluid refrigerant which is circulated between the receptacles. The heat dissipating surface of each receptacle is very much greater in area than the heat absorbing surface and should be at least twice the area of said heat absorbing surface. As a result there is a very rapid and highly efficient extraction of the heat from the substance being treated. With this relationship of heat absorbing to heat extracting surface the conveyor is effectively cooled by the circulating refrigerant even though the other refrigerant, namely, that in the receptacles, be omitted.

I have referred to the material as ice cream, but as above noted, various other analogous materials might be employed in the same process, as the process may be used in connection with any material which is delivered in a plastic, liquid or semi-liquid form and which is to be hardened, partially crystallized or solidified by a change in temperature while passing through the hardening chamber.

In the form illustrated the conveyors engage with all four sides of the tubular wrapper, but it will be obvious that if desired the edges of the wrapper need not be folded over the top of the ice cream bar and thus the upper conveyor 22 may be omitted. The four conveyors illustrated cause the ice cream bar to assume a rectangular form in cross-section, but it will, of course, be obvious that by using a larger or smaller number of conveyors properly juxtaposed, the bar might be of other cross-sectional form.

I have described the process as for producing ice cream bricks. By the term "brick" I do not wish to be limited to a brick of the size now commonly known as an ice cream brick and which includes a pint or quart of ice cream. The process is especially adaptable for making small bricks, such as would constitute individual portions for direct serving to the consumer.

In some cases it may be desirable to remove the wrapper from the material before the latter is subdivided into sections. The wrapper would then have served one of its main purposes, namely, to prevent the adhering of the freezing material to the conveyor during the freezing operation, and the contacting of the material with any part of the apparatus. The removed wrapper could thereafter be reused or discarded.

Having thus described my invention, what I claim as new and desire to secure by Letters Patent is:

1. The process of forming a solid body of an edible product, including enclosing the product in a wrapper, applying refrigerant to the top, bottom and lateral sides of the wrapper to solidify the material therein, and continuously advancing the material during such solidification.

2. The process of forming frozen bodies, including enclosing the material to be frozen in a wrapper, bringing a refrigerant containing receptacle into contact with one side of said wrapper, and advancing the material and receptacle in contact to effect solidification of the material during its advancing movement.

3. The method of forming a solid body of edible material, including delivering the material to a tubular wrapper, bringing a refrigerating conveyor into engagement with the wrapper to advance the latter and solidify the material therein, and varying the speed of advancement of the conveyor in accordance with the rate of delivery of the material to the wrapper.

4. The method of chilling a food product, including delivering the product to a tubular wrapper, continuously advancing the latter endwise, refrigerating the wrapper to solidify the material therein during such advancing movement, and varying the speed of advancement of the wrapper in accordance with the rate of delivery of the material thereto.

5. The method of continuously advancing a material and reducing the temperature thereof, including supporting the material upon the top, bottom and lateral sides and pressing down the top side by heat absorbing surfaces, continuously advancing said surfaces to thereby advance the material and chilling said surfaces during said advancing movement.

6. The method of packaging and preserving food, which consists in enclosing the food in a continuous tube, advancing the tube endwise, supporting the side surfaces of the tube during such advancement, and freezing the material during the advancing movement.

7. The process of preparing a food product which is liquid at body temperature, which includes enclosing it in a continuous tube, advancing the tube endwise, and quickly freezing the product in said tube by conduction from around substantially the entire periphery of the tube.

8. The method of packaging and preserving food which is liquid at body temperature, which consists in depositing the material in plastic form in a continuous casing open at front and rear ends, moving said casing endwise through a refrigerating zone in which heat conductive members are applied to opposite sides of the casing, and solidifying said material by subjecting said conductive members to a refrigerating medium while shielding the casing therefrom.

9. The method of packaging and preserving food which is liquid at body temperature, which includes enclosing the material in plastic form in a continuous tube open at front and rear ends, passing the tube endwise into a refrigerating zone to solidify it, and applying heat conductive members to opposite sides of the tube to support the latter and hold it in predetermined form.

10. The method of preparing a food product, which consists in cooling the food in liquid form to partially crystallize it, enclosing the product in plastic form in a wrapper in which it is to be marketed, engaging the bottom surface of the wrapper by a heat conductive member, engaging the side surfaces of the wrapper by a pair of spaced heat conductive members, and subjecting the product in said wrapper to a freezing temperature to further crystallize it through the medium of said engaging heat conductive members to solidify said food product.

11. The method of preparing a food product which is liquid at body temperature, which consists in freezing the same to semi-liquid or plastic form, enclosing it in a tube open at opposite ends while engaging a plurality of surfaces of the tube including the side surfaces thereof by heat conductive members, and subjecting the product in said tube to a freezing temperature while holding the tube in predetermined cross-sectional form by said conductive members to thereby solidify the product in predetermined form.

12. The method of preparing a food product, which consists in freezing the same to semi-liquid or plastic form, enclosing it in a tube open at opposite ends while engaging a plurality of surfaces of the tube including the side surfaces thereof by heat conductive members, subjecting the product in said tube to a freezing temperature while holding the tube in predetermined cross-sectional form by said conductive members to thereby solidify the product in predetermined form, and continuously advancing the tube and said conductive members.

13. The method of preparing a food product, which consists in enclosing the same in semi-liquid or plastic form in a tube, supporting a plurality of surfaces of the tube including the side surfaces thereof by heat conductive members, subjecting the product in said tube to a freezing temperature while holding the tube in predetermined cross-sectional form by said conductive members to thereby solidify the product in predetermined form, and subdividing the tube and product transversely into successive sections.

14. The process of preparing a food product, which includes forcing the material under pressure into a casing, freezing said product in said casing by conduction applied over a substantial area of said casing, and subdividing the frozen material into separate bricks to be marketed.

15. The method of preparing a food product which is liquid at body temperature, which includes delivering the material in plastic form, confining the delivered material to a stream of predetermined cross-sectional area, solidifying the stream to substantially solid bar form by the extraction of heat from the top, bottom and sides of the stream while advancing the bar endwise during the solidification, and subdividing said bar transversely into successive sections during its advancing movement.

16. The method of preparing a food product which is liquid at body temperature, which includes delivering the material in plastic form, confining the delivered material to a stream of predetermined cross-sectional area, solidifying the stream to substantially solid bar form by the extraction of heat from the stream, while continuously advancing the bar endwise during the solidification, and subdividing said bar transversely into successive sections during its continuous advancing movement.

17. The method of preparing a food product which is liquid at body temperature, which includes cooling the liquid to partially solidify it, delivering the material in plastic form, confining the delivered material to a stream of predetermined cross-sectional area, hardening the stream to substantially solid bar form by the extraction of heat from the stream, and subdividing said bar transversely into successive sections during its advancing movement.

18. The method of preparing a food product which is liquid at body temperature, which includes cooling the liquid to partially solidify it, delivering the material in plastic form, confining the delivered material to a stream of predetermined cross-sectional area, and hardening the stream to substantially solid bar form by the extraction of heat from the stream while advancing the bar endwise during the hardening.

19. The process for the continuous production of a refrigerated food product, including the steps of delivering a continuous strip of wrapping material in substantially channel form, delivering the food product to said channel, folding over the edges of said wrapping material to form a tube enclosing the food product, advancing the channel during the delivery of the food product thereto and the folding of said edges, supporting the walls of said tube to maintain a predetermined, uniform cross-sectional area, and solidifying the food product by reducing the temperature thereof while so supporting said side walls.

20. The process for the production of a refrigerated food product, including the steps of delivering a continuous strip of thin flexible wrapping material in substantially channel form, delivering the food product to said channel during the advancing movement, laterally supporting the sides of said channel to maintain said food product in predetermined crosssectional form and preventing bulging of the side walls of said channel, and solidifying the food product by reducing the temperature thereof while maintaining such cross-sectional form.

21. The process of forming a refrigerated food product, including delivering a partially frozen material into a wrapper of substantially channel form, and having thin, flexible side walls, continuously advancing the wrapper with the material therein, supporting the side walls of said wrapper to prevent lateral bulging thereof during the advancing movement, and solidifying the material by chilling the same during said advancing movement.

22. The process of forming bricks of a refrigerated food product, including partially freezing a material in liquid form, enclosing the material in a wrapper having thin, flexible side walls, continuously advancing the wrapper with the material therein; laterally supporting the side walls of the wrapper to prevent bulging and to maintain the material of predetermined cross-sectional form, and solidifying the material in said wrapper in said predetermined cross-sectional form during the delivery and solidification of the material.

23. The method of forming bricks of edible material, liquid at body temperature, including partially freezing a material in liquid form, enclosing the material in an endless tube of thin, flexible material, continuously advancing the tube endwise while supporting the tube to maintain a uniform predetermined cross-section, and solidifying the material in said tube by chilling the tube walls around substantially the entire periphery of the tube.

24. The method of forming a solid body of edible material, including partially freezing a material in liquid form, enclosing the material in a wrapper having thin, flexible, substantially parallel side walls, supporting said side walls to prevent bulging of the latter and maintain the edible material of a substantially uniform cross-sectional area during the advancement by said wrapper and material, and solidifying said material while maintaining said cross-sectional form by reducing the temperature thereof.

25. The method of forming a solid body of edible material, including enclosing the material in an endless tubular wrapper having thin, flexible, substantially parallel side walls, bringing conveying means into engagement with said side walls to prevent bulging of the latter and maintain the edible material of a substantially uniform cross-sectional area during the advancement by said conveying means, solidifying said material in said cross-sectional form by reducing the temperature thereof during the advancing movement, and subdividing the wrapper and material into successive separate sections.

26. The process of preparing a food product, which includes partially crystallizing the material, delivering the partially crystallized material to and enclosing it in a wrapper while substantially preventing contact of the material with the atmosphere, and further crystallizing said product while in said casing to form a substantially solid body.

27. The process of preparing a solid body of refrigerated edible material, including forcing the material in partially frozen and plastic or semi-liquid condition and under pressure into a casing, advancing the casing, further freezing the material to form-sustaining consistency during the advancing movement, and maintaining it under at least a portion of said pressure during the advancing movement and freezing step.

28. The process of preparing a solid body of refrigerated edible material, including forcing the material in liquid form into a tube under pressure, continuously advancing the tube endwise and solidifying the material in said tube during the advancing movement, and while under at least a portion of the pressure initially applied.

29. The process of preparing a frozen food product which includes continuously forming and advancing a tubular casing, forcing the partially frozen product through a closed conduit from the apparatus in which partial freezing has been effected, into said casing during the advancing movement of the latter, and subjecting the product to further freezing in said casing during the advancing movement.

30. The process of forming a refrigerated food product, including delivering a partially frozen material into a wrapper of substantially channel form having thin, flexible side walls, advancing the wrapper endwise during the delivery of the material thereto, subjecting the material in said wrapper to refrigerating action to further freeze and harden the same, and supporting the side walls of said wrapper to prevent lateral bulging thereof and to maintain a predeterminated cross-sectional form during the delivery and hardening of the material.

31. The method of preparing a frozen food product, which includes cooling the food product in liquid form to partially crystallize it, enclosing the partially crystallized product in a wrapper in which it is to be marketed, engaging the bottom and side surfaces of the wrapper by heat conductive members serving to support said wrapper and maintain a predetermined cross-sectional form, and subjecting the product in said wrapper to a freezing temperature to further crystallize and solidify it by withdrawing heat through said heat conductive members.

32. The process of manufacturing ice cream, including partially freezing a liquid, advancing endwise a non-edible, thin, flexible sheet of wrapping material in channel form, delivering the partially frozen liquid to said channel and advancing it in a stream of predetermined cross-sectional form in and with said channel, sustaining the sides and bottom of said wrapping material by heat conductive elements to maintain said form, refrigerating said elements to further freeze the partially frozen liquid into a bar of form sustaining consistency, and subdividing said bar and said wrapping material transversely into sections.

33. The process of forming blocks or bricks of ice cream, including delivering a paper strip endwise, folding said strip lengthwise to channel form during the delivery, supporting the sides and bottom of said channel by heat conducting members to maintain a predetermined cross-sectional form, advancing said members endwise and thereby advancing said channel, delivering a partially frozen and aerated material to said channel during its advancing movement, delivering said members and the strip and material supported thereby into a hardening chamber, chilling a gas, forcibly circulating said gas in said chamber to further freeze and harden the ice cream to solid bar form, separating the strip and bar from said heat conducting members, and transversely subdividing the ice cream bar and strip into successive sections.

34. The process of forming a refrigerated food product, including progressively forming and advancing a wrapper of substantially channel form having thin, flexible side walls, delivering a partially frozen material into said wrapper as the latter is formed, whereby the material is advanced with the wrapper, subjecting the material in said wrapper to refrigerating action to further freeze and harden the same, and supporting the side walls of said wrapper to prevent lateral bulging thereof and to maintain a predetermined cross-sectional form during the delivery and hardening of the material.

35. The process of forming bricks or blocks of a comestible, including confining the material in a passage of predetermined cross-section, continuously delivering material to one end of said passage, continuously advancing the material along said passage, progressively refrigerating said material in said passage as it is advanced, and at such a rate that the material is of form sustaining consistency at the delivery end of said passage, delivering the frozen material in bar form from the last mentioned end of the passage, and subdividing said bar transversely into successive sections.

36. The method of hardening a comestible by extracting latent heat therefrom including advancing the comestible along a predetermined path, abstracting latent heat from a refrigerant within a receptacle, bringing the receptacle into heat transfer relationship with said comestible during said advancing movement, to transfer latent heat from the comestible to the refrigerant.

Signed at New York, in the county of New York and State of New York, this 8th day of January, 1931.

CLARENCE W. VOGT.